United States Patent [19]

Haack

[11] Patent Number: 4,802,386
[45] Date of Patent: Feb. 7, 1989

[54] PRECISION ROTARY POSITIONING MECHANISM

[76] Inventor: August F. Haack, 3813 Don Juan Ct., NW, Albuquerque, N. Mex. 87107

[21] Appl. No.: 16,174

[22] Filed: Feb. 18, 1987

[51] Int. Cl.[4] .................. F16H 13/06; F16H 15/56; F16H 57/10; F16H 13/02
[52] U.S. Cl. ........................... 74/798; 74/772; 74/206
[58] Field of Search .............. 74/798, 772, 206, 796

[56] References Cited

U.S. PATENT DOCUMENTS

| | | | |
|---|---|---|---|
| 651,410 | 6/1900 | Ball | 74/798 |
| 1,545,243 | 7/1925 | Fletcher | 74/798 |
| 1,737,295 | 11/1929 | Bronander | 74/772 |
| 1,993,051 | 3/1935 | Dell et al. | 74/798 |
| 2,646,696 | 7/1953 | Kepes | 74/798 X |
| 2,839,952 | 6/1958 | Ondeck | 74/798 |
| 3,207,004 | 9/1965 | Chery | 74/798 |
| 3,224,300 | 12/1965 | Chery | 74/796 |
| 3,248,960 | 5/1966 | Schottler | 74/798 |
| 3,375,739 | 4/1968 | Nasvytis | 74/798 |
| 4,435,998 | 3/1984 | Kinoshita | 74/798 |

FOREIGN PATENT DOCUMENTS

| | | | |
|---|---|---|---|
| 54-10860 | 1/1979 | Japan | 74/798 |
| 57-1852 | 7/1982 | Japan | 74/798 |

Primary Examiner—Leslie A. Braun
Assistant Examiner—Harold F. Macris
Attorney, Agent, or Firm—Karla Ojanen

[57] ABSTRACT

A tapered roller bearing is transformed into a friction planetary drive system by incorporating shafts onto rollers and supporting these in an arm member by means of bearings. The use of a tapered roller bearing for the principal element of the system is key to a precision, low cost drive system design.

1 Claim, 1 Drawing Sheet

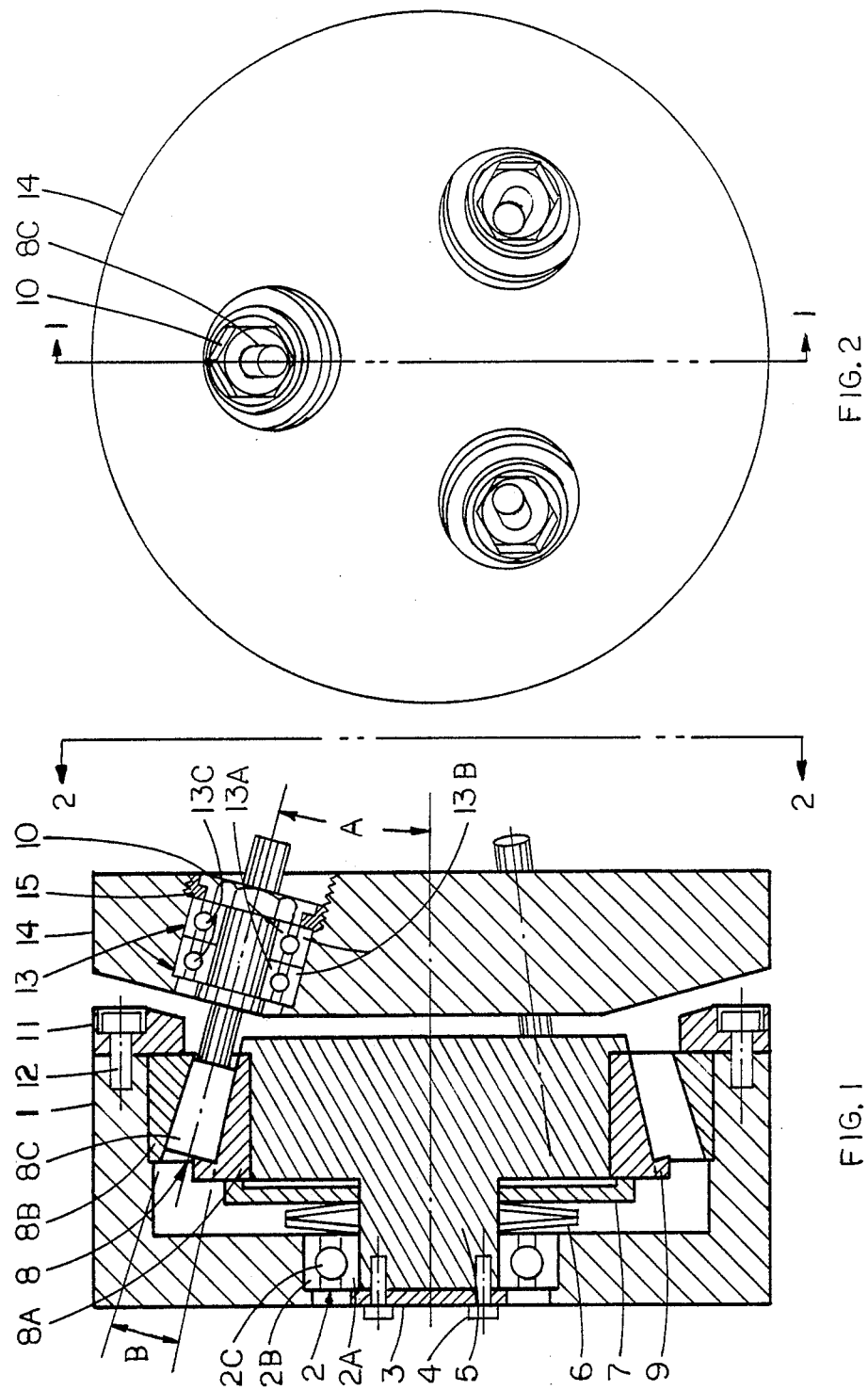

PRECISION ROTARY POSITIONING MECHANISM

FIELD OF INVENTION

This invention relates to a device used for precision rotational positioning. Candidate positioning applications include robotic joints and antenna and laser pointing mechanisms.

BACKGROUND OF THE INVENTION

The candidate devices presently available for obtaining mechanical advantage in rotary positioning mechanisms are: harmonic drives, planetary gear systems and worm gear reducers. Each of these devices have characteristics which limit their usefulness as precision positioning mechanisms. Harmonic drives have very high reduction ratios and low stiffness. Thus, very high input speeds are required to generate reasonable output speeds, and low system natural frequencies present potential design problems. Planetary gear systems have inherent backlash which is fundamentally incompatible with precision control. Precision worm gear reducers are expensive, bulky and have high levels of friction. Each of the cited shortcomings represents an effective limit on peak performance.

Accordingly, several objects of my invention are to provide a precision rotational positioning mechanism possessing mechanical advantage, which is essentially free of backlash and which posesses high rotational stiffness from input to output and low friction, i.e., the friction inherent in rolling contact bearings. Rotational stiffness from input to output is a measure of the amount of deformation of intermediate parts. High rotational stiffness permits the output to proportionally follow the input with minimum error. It also contributes to high system natural frequencies which permit accurate positioning to be performed at high rates of acceleration.

Another object of my invention is to provide a power transmission device with the previously described attributes, i.e., mechanical advantage, zero backlash, low friction and high rotational stiffness.

A further object of my invention is to permit the manufacture of the mechanism at low cost by using a standard tapered roller bearing as the key element in the mechanism.

Further objects and advantages of my invention will become apparent from a consideration of the drawings and ensuing description thereof.

BRIEF DESCRIPTION OF THE DRAWINGS

FIG. 1 is a sectional view of the preferred embodiment of the present invention.

FIG. 2 is an end view taken as shown by 2—2 in FIG. 1.

DESCRIPTION OF THE PREFERRED EMBODIMENT

Referring to FIG. 1: A tapered roller bearing assembly 8 comprises a tapered roller bearing outer race 8b, a tapered roller bearing inner race 8a and three or more tapered roller/shafts 8c, is mounted in housing 1 and provides support for shaft 5. The tapered roller bearing outer race 8b is clamped to the housing 1 by means of the split clamp 11 and screws 12. The tapered roller bearing inner race 8a is pressed onto shaft 5 and is axially biased by means of springs 6 and pusher 7. The preload is reacted by central ball bearing assembly 2 whose central bearing inner race 2a rides against spring 6 and whose central bearing outer race 2b is supported in housing 1 wherein central bearing balls 2c are positioned between central bearing inner race 2a and central bearing outer race 2b. A bearing shoulder is provided by ring 3 which is secured to shaft 5 with screws 4. Shaft 5 is fully supported by tapered bearing inner race 8a. Clearance exists between shaft 5 and central bearing inner race 8a and between ring 3 and central bearing inner race 2a. The tapered roller/shafts 8c fully support carrier 14 by means of carrier ball bearing assemblies 13, roller/shaft nuts 10 and carrier bearing nuts 15. The carrier ball bearing assemblies 13 have carrier bearing balls 13c positioned between the carrier bearing inner races 13a and the carrier bearing outer races 13b. The tapered roller restraining shoulder 9, normally present on the tapered roller bearing inner race 8a of the tapered roller bearing assembly 8 to axially position the tapered roller/shafts 8c, may be used or, alternatively, may be removed since the tapered roller/shafts 8c are effectively positioned by their mountings in the carrier 14. The tapered roller bearing inner race 8a and the tapered roller bearing outer race 8b are elements of a standard tapered roller bearing common in the art which may be purchased at low cost from any of several manufacturers. The tapered roller/shafts 8c may be fabricated using rollers from the standard bearing by drilling holes through the rollers and pressing in shafts to form the integral tapered roller/shafts 8c. FIG. 2 is an end view of the invention which shows the orientation of the tapered roller/shafts 8c.

Referring to FIG. 1. The invention implements a planetary reduction mechanism in which the tapered roller/shafts 8c serve as the planet members, the tapered roller bearing inner race 8a and shaft 5 serve as the sun member, the tapered roller bearing outer race 8b and housing 1 serve as the ring member and the carrier 14 serves as the arm member. As is well understood in planetary drives, each member rotates at a speed which is a fixed ratio of the input member speed. In the case of the present invention, that ratio is a function of angle A, the tapered roller/shaft 8c angle with respect to the shaft 5 axis, and angle B, the included angle of the tapered roller/shaft 8c.

The torque capacity of the mechanism is a function of the bias applied by the springs 6, the aforementioned angles, A and B, the mean diameters of the tapered roller bearing inner race 8a, the tapered roller/shaft 8c and the coefficient of friction within the tapered roller bearing assembly 8.

The input to the mechanism is at one of the tapered roller/shafts 8c. Any of the other members, i.e., housing 1, carrier 14 or shaft 5, may serve as the output member providing one of the remaining members is held stationary. For the configuration which uses shaft 5 as the output member with the housing 1 held stationary, operation is as follows: tapered roller/shaft 8c is turned by some means, e.g., a motor, another stage of a reduction mechanism, or manually. Since the housing 1 and the tapered roller bearing outer race 8b are stationary, the tapered roller/shafts 8c roll around the tapered roller bearing outer race 8b with no sliding motion because they are squeezed between the tapered roller bearing inner race 8a and the tapered roller bearing outer race 8b by forces derived from the axial spring 6 biasing the tapered roller bearing inner race 8a through pusher 7. The rotational angle of the tapered roller/shafts 8c has two components, one about the axis of the tapered roller/shaft 8c itself and the other about the central axis of the mechanism. The carrier 14 rotates about the central axis of the mechanism at the same rate as the tapered roller/shafts 8c since they are joined to each other by means of the carrier ball bearing assemblies 13. These carrier ball bearing assemblies 13 permit the tapered roller/shafts 8c to rotate within the carrier 14, with minimum friction, and fully support the carrier 14 on the tapered roller/shafts 8c. The rolling motion of the tapered roller/shafts 8c about their own axes and the central axis of the mechanism causes the tapered roller bearing inner race 8a to rotate about the central axis. This motion is constrained to pure rolling on the tapered roller/shafts 8c by the previously mentioned squeezing force and the precision geometry of the tapered roller bearing assembly 8. The precision of this motion is entirely governed by the accuracy of the tapered roller bearing assembly 8. Central ball bearing assembly 2 serves only to allow spring 6 to rotate with pusher 7, shaft 5 and tapered roller bearing inner race 8a with minimum friction. A small clearance exists between central bearing inner race 2a and shaft 5 and between central bearing inner race 2a and ring 3. Thus, the motion of shaft 5 is not influenced by central ball bearing assembly 2. For this configuration, as previously stated, shaft 5 is the output member and serves to perform the precision positioning or power transmission function. In the precision positioning application, the item to be positioned is mounted to shaft 5, the output member.

For configurations which use members other than shaft 5 for the output member, operation is analogous to that described in the above paragraph.

The mechanism is ideally suited for precision positioning applications. Precision positioning is the ability to precisely position the output member to an angular location which is a function of the input member angular location in a repeatable manner, with low opposing friction, and with relative insensitivity to the load on the output member. The invention possesses this ability because of the absence of backlash, the presence of low friction levels, its inherently high rotational stiffness and the precision geometry of the rolling elements, standard tapered roller bearings and ball bearings.

The mechanism is free of backlash because the parts which transmit the motion are always in intimate contact with each other and are under substantial load. Thus, the parts have no opportunity to move independently of each other.

All parts in contact with each other which have relative motion move with rolling action rather than sliding and thus produce minimum friction. These parts are the tapered roller/shafts 8c in contact with both the tapered roller bearing inner race 8a and the tapered roller bearing outer race 8b of the tapered roller bearing assembly 8; the carrier bearing balls 13c in contact with the carrier bearing inner race 13a and the carrier bearing outer race 13b of the carrier ball bearing assembly 13; and the central bearing balls 2c in contact with the central bearing inner race 2a and the central bearing outer race 2b of the central ball bearing assembly 2 engaging the bias spring 6.

The manner in which the carrier 14 is supported also contributes to achieving a low friction mechanism. The carrier 14 is supported entirely by the three tapered roller/shafts 8c on the carrier ball bearing assemblies 13. No central bearing is used which would only introduce additional friction and complicate the problem of aligning the tapered roller/shafts 8c with the carrier ball bearing assemblies 13. Inaccurate alignment is a major contributor to friction in mechanisms. By using a three-point mount for the carrier 14, the three tapered roller/shafts 8c, an ideal mounting arrangement is achieved.

Another feature which contributes to low friction is the support of the central shaft 5 entirely by the tapered roller bearing assembly 8 consisting of tapered roller bearing outer race 8b, tapered roller/shafts 8c and tapered roller bearing inner race 8a. Because it is entirely supported by a single bearing, potential alignment problems with additional bearings are avoided. As previously stated, inaccurate alignment is a major contributor to friction in mechanisms.

The mechanism possesses high rotational stiffness from input to output because each part which carries torque is, in itself, inherently stiff. These parts are: the carrier 14, the tapered roller/shafts 8c, the tapered roller bearing outer race 8b, the tapered roller bearing inner race 8a and the central shaft 5.

Other variations of the invention are possible. For example: the shafts made a part of the tapered roller/shaft 8c may be placed on the opposite side of the tapered roller with its supporting carrier ball bearing assemblies 13 and carrier 14 also transposed. Furthermore, the problem of aligning the tapered roller/shafts 8c and their carrier ball bearing assemblies 13 with the bores of the carrier 14 may be alleviated by providing a bearing capsule whose position with respect to the arm is self-aligning, or adjustable. Alternatively, a compliant flexure may be provided between the carrier 14 and the carrier ball bearing assembly 13.

Additional mechanical advantage and positioning accuracy may be obtained by utilizing two or more precision positioning mechanisms whereby the output of one serves as the input to the next.

I claim:

1. A rotary positioning apparatus comprising:
   a. a carrier having a central axis;
   b. a plurality of roller/shafts whose axes are oblique to the axis of the carrier;
   c. bearing means rotatably mounting a first end of each roller/shaft in the carrier;
   d. housing means;
   e. a central shaft member rotatably mounted within the housing means;
   f. wherein the second end of each roller/shaft is tapered and mounted between the central shaft and housing by an inner race and an outer race;
   g. biasing means positioned within the housing means to bias the housing and central shaft so that the races are biased against the tapered ends of the roller/shafts;
   h. whereby a rotational input to the device is provided at the first end of one of said roller/shafts;
   i. whereby a rotational output member may be the central shaft, the housing, or the carrier, when one of the three is held stationary, and a device to be positioned is affixed to the output member by an attachment means.

* * * * *